(12) United States Patent
Lortscher et al.

(10) Patent No.: US 6,947,897 B2
(45) Date of Patent: Sep. 20, 2005

(54) SYSTEM AND METHOD FOR MANAGING CONSUMER INFORMATION

(75) Inventors: Frank D. Lortscher, Richmond, VA (US); Tom Allatt Broadhead, Ruther Glen, VA (US); Frank G. LaPrade, III, Richmond, VA (US)

(73) Assignee: Capital One Financial Corporation, McLean, VA (US)

( * ) Notice: Subject to any disclaimer, the term of this patent is extended or adjusted under 35 U.S.C. 154(b) by 529 days.

(21) Appl. No.: 09/781,198

(22) Filed: Feb. 13, 2001

(65) Prior Publication Data

US 2002/0111816 A1 Aug. 15, 2002

(51) Int. Cl.[7] ............................................. G06F 17/60
(52) U.S. Cl. ............................................. 705/14; 705/1
(58) Field of Search .................. 705/14, 1, 10, 705/18, 26, 27, 35, 37, 40, 44, 53, 59, 74

(56) References Cited

U.S. PATENT DOCUMENTS

| | | | | |
|---|---|---|---|---|
| 5,410,598 A | * | 4/1995 | Shear | 705/53 |
| 5,636,346 A | | 6/1997 | Saxe | 395/201 |
| 5,794,210 A | | 8/1998 | Goldhaber et al. | |
| 5,855,008 A | | 12/1998 | Goldhaber et al. | |
| 5,881,231 A | * | 3/1999 | Takagi et al. | 709/212 |
| 5,987,440 A | | 11/1999 | O'Neil et al. | |
| 6,236,971 B1 | * | 5/2001 | Stefik et al. | 705/1 |
| 6,360,271 B1 | * | 3/2002 | Schuster et al. | 709/231 |
| 6,639,976 B1 | * | 10/2003 | Shellum et al. | 379/112.06 |
| 6,658,455 B1 | * | 12/2003 | Weinman, Jr. | 709/203 |
| 2001/0018706 A1 | * | 8/2001 | Ando et al. | 705/26 |
| 2001/0034647 A1 | * | 10/2001 | Marks et al. | 705/14 |
| 2002/0026348 A1 | * | 2/2002 | Fowler et al. | 705/10 |
| 2002/0046099 A1 | | 4/2002 | Frengut et al. | 705/14 |
| 2002/0049701 A1 | | 4/2002 | Nabe et al. | 707/1 |
| 2003/0208400 A1 | * | 11/2003 | Kuo et al. | 705/14 |

FOREIGN PATENT DOCUMENTS

| | | |
|---|---|---|
| JP | 02002007594 A | 1/2002 |
| JP | 0200204739 A | 2/2002 |
| WO | WO 02/065236 | 8/2002 |

OTHER PUBLICATIONS

Thomas M. A. "What's in a Customer's Name? Maybe Big Bucks"; New Brunswick: Nov. 2000, vol. 13, Iss. 45; p. 30.*
Svete, I. "Free Internet service provides lucrative for start-up". Puget Sound Business Journal: Jul. 1999, vol. 20, Iss. 10; p. 28.*

* cited by examiner

*Primary Examiner*—John G. Weiss
*Assistant Examiner*—Igor Borissov
(74) *Attorney, Agent, or Firm*—Finnegan, Henderson, Farabow, Garrett & Dunner, LLP (57) ABSTRACT

A system and method are provided for managing consumer information, which permit sharing of consumer information in a controlled manner. In accordance with the disclosed system, at least one database is provided that contains consumer information related to at least one user. An administrative agent is also provided for establishing access to the consumer information contained in the database based on preferences expressed by the user. The system also includes a licensing agent for setting at least one licensing fee schedule for each user based on a set of licensing rules, and a payment agent for paying each user. In accordance with a disclosed method, a database is created of consumer information related to at least one user and access to the consumer information contained in the database is established based on each user's preferences. The method also includes setting a licensing fee schedule based on a set of licensing rules and paying the customer based on a set of payment rules.

102 Claims, 8 Drawing Sheets

SYSTEM AND METHOD FOR MANAGING CONSUMER INFORMATION

BACKGROUND OF THE INVENTION

I. Field of the Invention

The present invention relates generally to systems and methods for managing consumer information. More particularly, the invention relates to systems and methods for managing consumer information, which permit access and sharing of consumer information in a controlled manner.

II. Description of the Related Art

The Internet has become a very efficient tool for entities that gather consumer information. Using the Internet and powerful database tools, businesses are increasingly targeting consumers with direct mail and other forms of solicitations. At the same time, however, consumers are becoming more concerned with use of their personal information. For example, many consumers, including Internet users, oppose direct marketing and sale of personal information, such as an individual's credit history and purchasing habits without their consent or any benefit to them. According to the latest surveys, a large percentage of Internet users support new laws to protect privacy in general, and in particular to protect privacy on the Internet. Disgruntled consumers are increasingly putting pressure on both state legislatures and Congress to enact legislation restricting sharing and sale of consumer information. It is contemplated, however, that legislation restricting the sharing and sale of consumer information will deprive many businesses of the information they need to effectively target individuals.

At the same time, consumers' concerns about lack of control over their personal information are genuine and need to be addressed. Traditionally, businesses have paid little attention to consumers' needs for privacy and have shared consumer information without consumer approval. In view of possible new legislation and increasing customer awareness of the use and sharing of their personal information, an innovative approach is needed to facilitate sharing of consumer information while addressing consumer concerns regarding control over their personal information.

SUMMARY OF THE INVENTION

Methods, systems, and articles of manufacture consistent with the present invention provide a system and method for managing consumer information—both initially and over time—which permits access and sharing of consumer information in a controlled manner. Specifically, in accordance with the principles of the present invention, a system is provided that comprises at least one database containing consumer information related to at least one user. It further includes at least one administrative agent for establishing access to the consumer information contained in the database based on preferences expressed by the user. It also includes at least one licensing agent for setting at least one licensing fee schedule for the customer based on application of a set of licensing rules. The system further includes a payment agent for paying the user based on the access and use of their information.

In accordance with the principles of the present invention, a method is also provided for facilitating the sharing of consumer information between users and subscribers. The method includes creating a database of consumer information related to at least one user and establishing access to the consumer information contained in the database based on the preferences of the user. It further includes setting a licensing fee schedule based on the application of licensing rules and paying the user based on the application of payment rules.

BRIEF DESCRIPTION OF THE DRAWINGS

The accompanying drawings, which are incorporated in and constitute a part of this specification, illustrate the various features and aspects of the invention and, together with the description, serve to explain the advantages and principles of the invention. In the drawings.

DETAILED DESCRIPTION

The following detailed description of the invention refers to the accompanying drawings. Although the description includes exemplary implementations, other implementations are possible, and changes may be made to the implementations described herein without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

According to the invention, a system and method are provided for managing consumer information, which permits sharing of consumer information between users and subscribers. The present invention is advantageous over past approaches in that it permits users to set and control access to their personal information both at the time the user information is first provided to the system and over time in the future. In this way, individuals can control which merchants and other entities have access to their personal information. Thus, unlike other databases such as those maintained by credit bureaus, creditors, retailers, insurance companies, or other companies, consumers, users of the disclosed system, will be more likely to voluntarily contribute their information. In addition, the present system allows users to specifically designate the subscribers who may access their information by various criteria including, for example, type of company, type of offer, amount or type of compensation that a user will receive, or types of marketing channel.

According to one aspect of the invention, a system is provided that comprises at least one database containing consumer information related to at least one user. It further includes at least one administrative agent for establishing access to the consumer information contained in the database based on preferences expressed by the user. It also includes at least one licensing agent for setting at least one licensing fee schedule for the user based on a set of licensing rules. The system further includes a payment agent for paying each user. A method is also provided for facilitating the management and sharing of consumer information between users and subscribers. The method includes creating a database of consumer information related to at least one user and establishing access to the consumer information contained in the database based on each user's preferences. It further includes setting a licensing fee schedule based on the application of licensing rules and paying each user based on the application of payment rules.

Systems and methods consistent with the principles of the invention provide a system (referred to herein as a "privacy system") that permit users to manage and control access to their personal information. Information contributed by users to the privacy system or obtained by the operators of the privacy system from other sources may include financial, demographic, marketing, or psychometric information. For example, the financial information may include income information, loan information, credit report information, asset-account information, transaction information related to various accounts, and deposit information. The demographic information may include census bureau information or information obtained from demographic information vendors, such as Polk & Donnelly. The marketing information may include information obtained from product surveys, information on offers received by the users of the privacy system, and information on their responses to such offers. The psychometric information may include personal preferences of the users of the system such as hobbies that they have, their favorite books, and the magazines that they read. These categories of information and their content are merely exemplary and other types of information may be included as part of the personal or consumer information.

Each user who provides information to the privacy system also defines their preferences as to how their information is shared with third parties (e.g., merchants, marketing firms, etc.). These preferences, which are initially set by each user, may be modified any time in the future by each user. By collecting consumer information from many users, the privacy system is capable of collecting fees from third parties that access the information under the control of the privacy system. As an incentive to users of the system, part of these collected fees may be passed on to users according to predefined licensing and payment rules.

Figure 1:
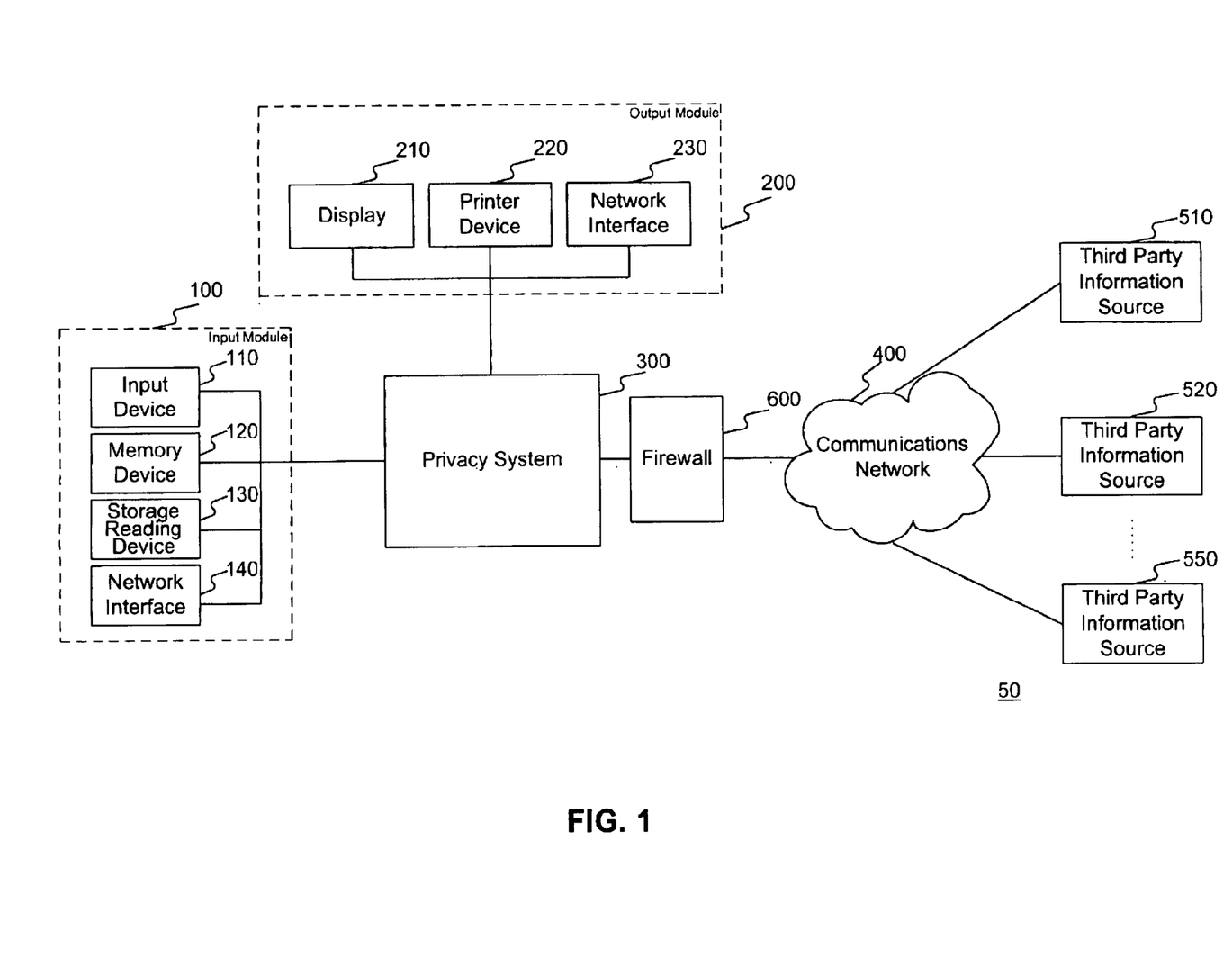
FIG. 1 illustrates an exemplary system environment in which the features of the present invention may be implemented.

By way of a non-limiting example, FIG. 1 illustrates a system environment 50 in which the features and principles of the present invention may be implemented. As illustrated in the block diagram of FIG. 1, system environment 50 includes an input module 100, an output module 200, a firewall 600, a privacy system 300, and one or more third party information sources 510–550 that may be accessed through a communications network 400. Firewall 600 protects the resources and information stored in privacy system 300. Privacy system 300 provides the functionality and computing capabilities necessary to process and store consumer information. The consumer information may be provided by users of the system through network devices (not shown) connected to communications network 400 or collected and provided through input module 100. Consumer information may also be obtained from one or more of the third party information sources 510–550 through, for example, communications network 400. Third party information sources 510–550 may include marketing lists maintained by the Direct Marketing Association, transaction information maintained by credit card companies, or any other collection of consumer information. The consumer information contained in privacy system 300 may be provided, on a controlled basis, to output module 200 for printing, displaying, or viewing or further communication to other system devices through communications network 400.

In the embodiment of FIG. 1, communications network 400 may comprise, alone or in any suitable combination, a telephony-based network (such as a PBX or POTS), a local area network (LAN), a wide area network (WAN), a dedicated Intranet, and/or the Internet. Furthermore, any suitable combination of wired and/or wireless components and systems may be incorporated into communications network 400. Although, FIG. 1 depicts privacy system 300, input module 100 and output module 200 directly connected to each other, these components may be connected through communications network 400.

Input module 100 of system environment 50 may be implemented with a wide variety of devices to receive and/or provide the data as input to privacy system 300. As illustrated in FIG. 1, input module 100 includes an input device 110, a memory device 120, a storage reading device 130, and/or a network interface 140. Input device 110 may comprise a keyboard, a mouse, a disk drive or any other suitable input device, for example, an optical character recognition based scanner, for providing consumer information as input to privacy system 300. Memory device 1 may be implemented with various forms of memory or storage devices, such as read-only memory (ROM) devices and random access memory (RAM) devices. Storage reading device 130 may include a memory tape or disk drive for reading and providing consumer information on a storage tape or disk as input to privacy system 300. Input module 100 may also include network interface 140, as illustrated in FIG. 1, to receive data over a network (such as a LAN, WAN, Intranet or the Internet) and to provide the same as input to privacy system 300. For example, network interface 140 may be connected to a public or private database over a network for the purpose of receiving and transferring consumer information to privacy system 300. Alternatively, network interface 140 may be adapted to directly receive personal information from users from a network device (such as a personal computer, hand held device, wireless phone, etc.) connected to a communication network.

As further illustrated in FIG. 1, output module 200 includes a display 210, a printer device 220, and/or a network interface 230 for receiving and providing, as output, the consumer information from privacy system 300. As indicated above, the output from privacy system 300 may be displayed or viewed through display 210 (such as a CRT or LCD) and/or printer device 220. Network interface 230 is provided to facilitate the communication of the results from privacy system over a network (such as a LAN, WAN, Intranet or the Internet) to remote or dispersed locations for analysis or viewing. The output from output module 200 can be used by the subscriber of the privacy system 300, such as merchants or marketing firms who are interested in using the consumer information contained in privacy system for marketing or other purposes.

Figure 2:
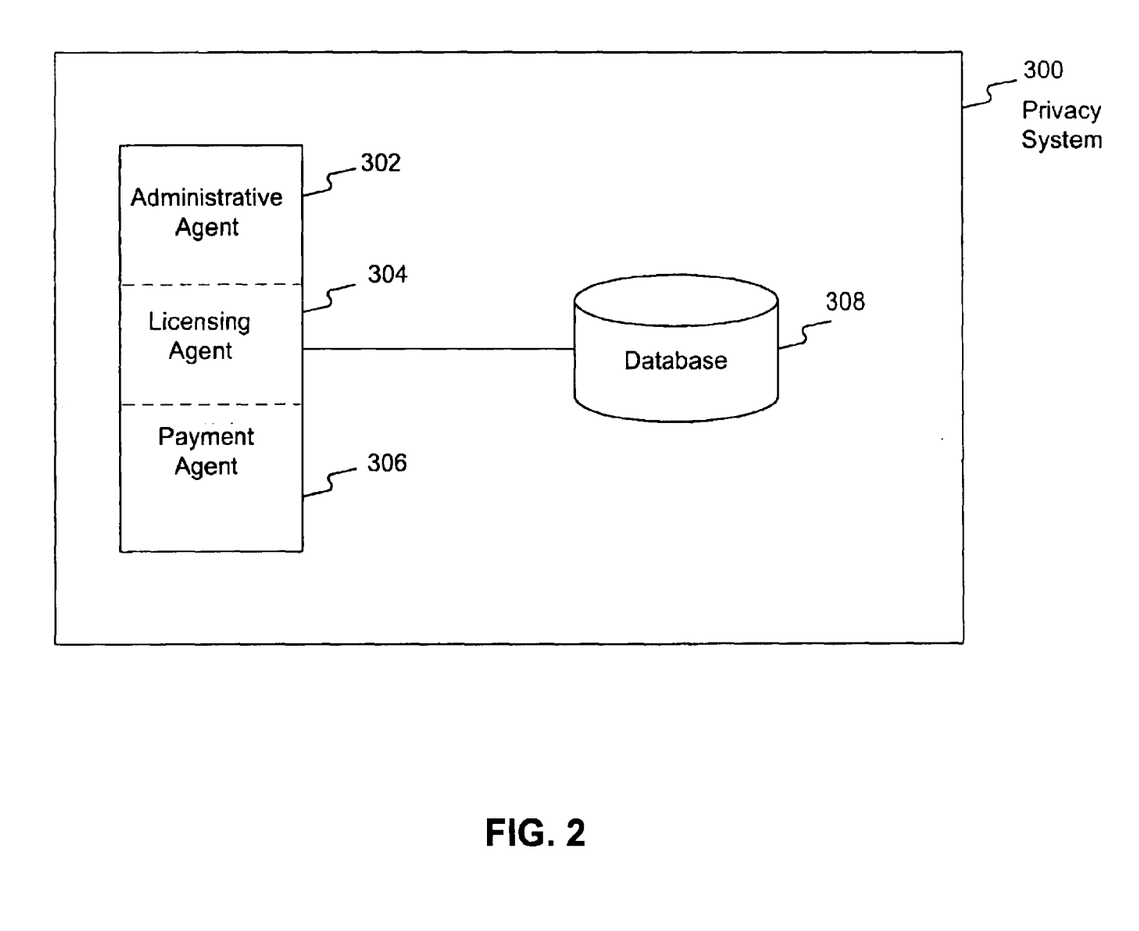
FIG. 2 depicts an exemplary privacy system, consistent with the present invention.

FIG. 2 depicts an exemplary implementation of privacy system 300, consistent with the present invention. As shown in FIG. 2, privacy system 300 may include an administrative agent 302, a licensing agent 304, a payment agent 306, and a database 308. Administrative agent 302 performs various functions for administering the system, including functions associated with maintaining database 308. Licensing agent 304 sets licensing fees to be paid to users who contribute personal information to privacy system 300. Payment agent 306 pays licensing fees and other rewards to contributors of personal information. Each of these components may be programs that, when executed by a processor operatively connected to a memory, provide the functionality associated with these components. One skilled in the art will appreciate that the functionality associated with licensing agent and payment agent may be combined with, for example, administrative agent so that all of the functions associated with these components are performed by a single component. Conversely, the functionality associated with these components may be further sub-divided into other components according to the needs of the system. Further, although these components are depicted as being located on the same system, the components of FIG. 2 may be distributed on networked computers or computing platforms.

Although aspects of the present invention are generally described as being stored in memory, one skilled in the art will appreciate that these aspects may be stored on or read from various computer-readable media, such as secondary storage devices, like hard disks, floppy disks, and CD-ROM; a carrier wave received from a network like the Internet; or other forms of ROM or RAM. Additionally, although specific components and programs of the privacy systems are depicted in FIG. 2, one skilled in the art will appreciate that these may contain additional or different components or programs.

In accordance with the principles of the present invention, an exemplary process for selecting potential users of the privacy system, determining the type of incentive to offer to each potential user, and creating a user account upon receiving a response from the user will now be described with reference to FIGS. 3 and 4.

Figure 3:
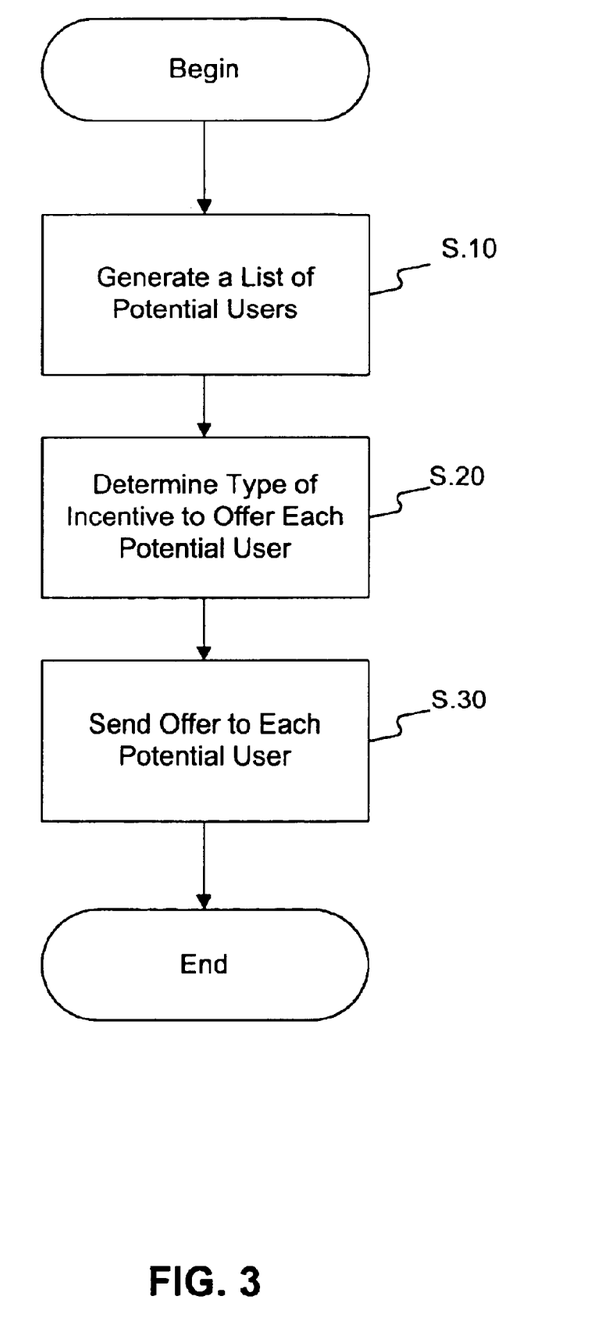
FIG. 3 depicts an exemplary flow chart of a process for selecting potential users of the privacy system to send offers to participate in the system, consistent with the present invention.

FIG. 3 is an exemplary flow chart of a process for selecting potential users to send offers to participate in the privacy system, consistent with the present invention. As illustrated in FIG. 2, the owner of privacy system 300 first generates a list of potential users (step S.10). The list of potential users may be obtained from various sources, such as the Direct Marketing Association or other agencies that maintain mailing lists of consumers or potential users. Names of potential users may be obtained from preexisting users of the privacy system as well. Additionally, to encourage existing users to bring new users to the system a multi-level marketing structure may be used.

Having generated the list of potential users, the owner of privacy system 300 then determines the type of incentives to offer to each potential user (step S.20). Several incentives may be offered to potential users to encourage them to become a member of privacy system 300. For example, products may be given away to potential users who sign up to become a member. Free credit reports may be offered as an incentive as well. Alternatively, free services on a Website associated with privacy system 300 may be offered, for example, a financial manager service may be offered. One skilled in the art will appreciate that other incentives and combination of incentives may be offered to encourage users to become a member of privacy system 300.

After determining the type of incentive to offer, the owner of privacy system 300 sends an offer to each potential user (step S.30). The offers sent to potential users may be sent in the form of a solicitation or offer letters through the mail and/or they may be electronically transmitted to the potential users on the list. The offers may be sent by the owner of privacy system 300 or may be sent by a third party contracted by the owner. In addition, the offers may be branded, in that each offer may have a logo identifying the owner of the privacy system making the offer. The branding of the offers will further help in establishing a level of trust and familiarity that users need to share their personal information with the owner of the privacy system.

Figure 4:
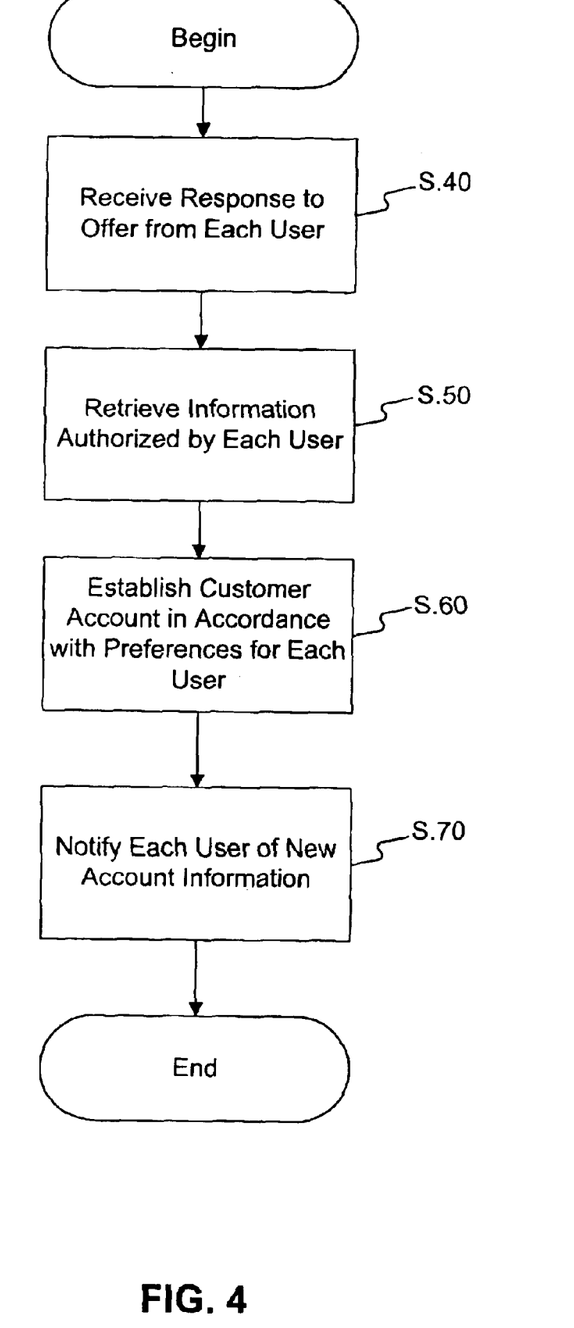
FIG. 4 depicts an exemplary flow chart of a process for establishing user accounts, consistent with the present invention.

FIG. 4 depicts an exemplary flow chart of a process for establishing user accounts, consistent with the present invention. As shown in FIG. 4, privacy system owner first receives the response to an offer from a potential customer (step S.40). The response from the consumer may include personal information supplied by the user that the user wants to license to subscribers of the privacy system, such as merchants or marketing firms. Information provided by a user in a response may be provided as input to privacy system 300 by input module 100 or through communication network 400. Responses from users may be received by mail in a form of a letter or electronically, for example, via email or electronic messaging. Also, a user may respond to an offer by inputting information for the privacy system into a personal computer connected to communications network 400. In addition, a response from a user may include an authorization by the user to collect and retrieve personal information about the user from one or more third party information sources 510, 520 . . . 550.

After receiving a response to an offer, the owner of the privacy system retrieves personal information about the user that the user authorized the owner to retrieve (step S.50). As part of this step, privacy system 300 may retrieve information from third party information sources 510, 520, . . . 550. Such information retrieval may be electronic, for example, via an email transfer. Information from third party sources may be obtained through regular mail. One skilled in the art will appreciate that this step may involve authenticating the user's identity and other steps to, for example, successfully transfer third party information to the privacy system. The retrieved information is stored in database 308, which may be included as a component of privacy system 300, as depicted in FIG. 2. A user may also express preferences as to which third party sources could be contacted by the operator of the privacy system to obtain information concerning that user.

Having retrieved information from third party sources, a user account is then established in accordance with the user's preferences (step S.60). As part of this process, a unique user ID will be associated with each user in order to track information concerning that user. Also, as part of this step, each user's preferences are stored in database 308. These preferences dictate the access and sharing of their personal information, for example, the extent of information that may be shared with each subscriber to the privacy system.

In addition, a deposit account is setup such that licensing fees earned by the user may be deposited. This account may be an online account, or it may be a regular checking account where subscribers, such as merchants, who license a particular user's personal information may deposit licensing fees. A merchant may also deposits fees or other forms of compensation, such as frequent flier miles upon the user's purchase of a product or service from the merchant. Such accounts may be setup by the privacy system owner on its own, or through another company, such as a depository institution that agrees to setup such accounts. Also, as part of this step, the privacy system may verify the personal information provided by the user through third party sources. One skilled in the art will appreciate that this step may involve other housekeeping steps.

Having established the customer account, the user is notified of the new account information (step S.70). This notification may include the unique ID assigned to user and/or account number for future reference. The user's personal information and/or access preferences associated with the account may also be provided so that the user can confirm the same. In addition, a password may also be supplied to the user, such that using the unique ID and password pairing a user may change his or her account information, including personal information and/or access preferences associated with the account.

Figure 5:
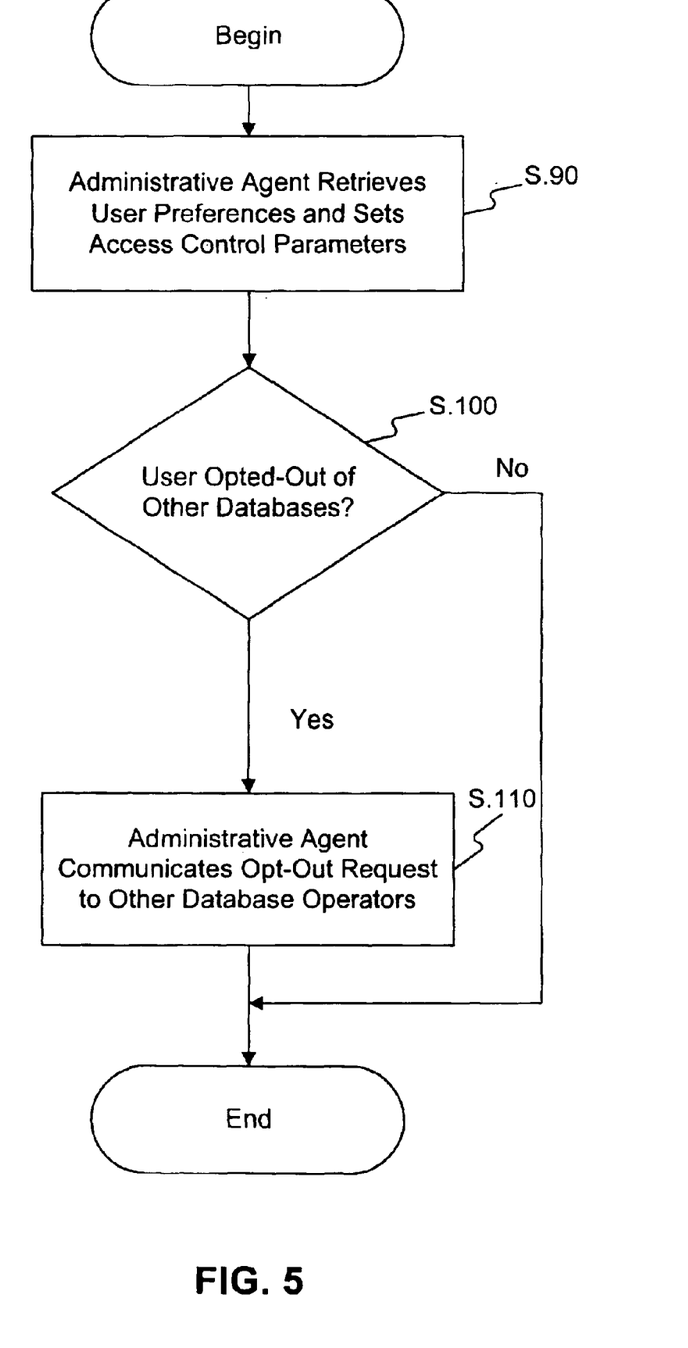
FIG. 5 depicts an exemplary flow chart of a process for creating a privacy database, consistent with the present invention.

FIG. 5 depicts a flowchart of the steps taken by administrative agent 302 to further setup the privacy system for use by the subscribers. Administrative agent 302 retrieves each user's preferences and sets access control parameters to database 308 in accordance with these preferences (step S.90). This step may involve determining, for each account, the type of access and the level of sharing a particular user prefers. In accordance with the invention, a user may either express preferences specific to each subscriber (e.g., identification by company name) or may express group preferences. For example, a customer may want his or her information to be available to only companies in certain industries or only companies with certain policies (such as companies that are environment friendly or companies that do not invest in tobacco stocks). In addition, each user may also express preferences related to the types of merchant offers that the user wishes to receive, or the types of channels through which the user is willing to receive offers. For example, a user may specify that he or she does not want to receive any offers for particular products (such as pet food, clothing etc.). A user may also specify that the user, for example, is not willing to receive telemarketing offers, but is willing to receive mail offers or electronic mail offers. Finally, a user may also express preferences based on the amount of licensing fees or other rewards that he or she may receive for licensing her information and/or purchasing a merchant's product or service. For example, a user may provide that he or she only wants to license her information to those companies that pay at least ten dollars a month for licensing her information. Based on each user's preferences, administrative agent 302 sets up the access control parameters that control access to the personal information related to each user. Accordingly, each subscriber may access only the information a particular user has authorized that particular subscriber to access. In addition, each subscriber may be contractually bound to the preferences expressed by each user of the privacy system.

Access control to consumer information stored in database 308 may be achieved by conventional access control techniques used for granting access to information in databases. For example, subscribers may be required to enter a user name and a password and upon authentication may be granted access to the types of personal information that is available to them. In addition, subscribers may be required to agree to not disclosing or sharing the consumer information with others without express permission from the user permitting such disclosing or sharing of his or her information.

Having set the access control parameters, administrative agent 302 determines whether each user chose to opt-out of other consumer information databases (step S.100). Privacy system 300 provides users the ability to have their names placed on opt-out or do not solicit lists. Such lists are maintained by the Direct Marketing Association and other major credit bureaus. This feature enables a user to have more control over the use of their personal information by preventing distribution and use of their information by third parties. This feature also increases the value of the consumer information stored in privacy system 300, and thereby potentially increases license fees paid to the privacy system users. Specifically, by opting out users make their personal information a more scarce commodity, and thus these users can reap more rewards for the sharing of their personal information through the privacy system. The opt-out of other databases may be implemented in several ways.

In one implementation, privacy system 300 may provide users with hyper-linked form letters or buttons via an Internet browser interface, such that customers may send letters themselves to the respective database owners, In another implementation, privacy system 300 may provide users with buttons or other user interface icons permitting customers to select the lists or databases that the customers want to opt-out of. Subsequently, human operators, artificial intelligence based operators, or a combination of the two may process customer requests concerning opt-outs.

If a user chooses to opt-out of some databases, then the administrative agent 302 communicates the opt-out request to those database operators (step S.110). In the first implementation of the opt-out feature, this step may not be necessary, in that an email program or some other programmed instructions may automatically communicate a user's request to the selected database operator. In relation to this step, administrative agent 302 may send electronic or regular mail reminders to users reminding them to opt-out of other databases so as to increase the value of their personal information.

Figure 6:
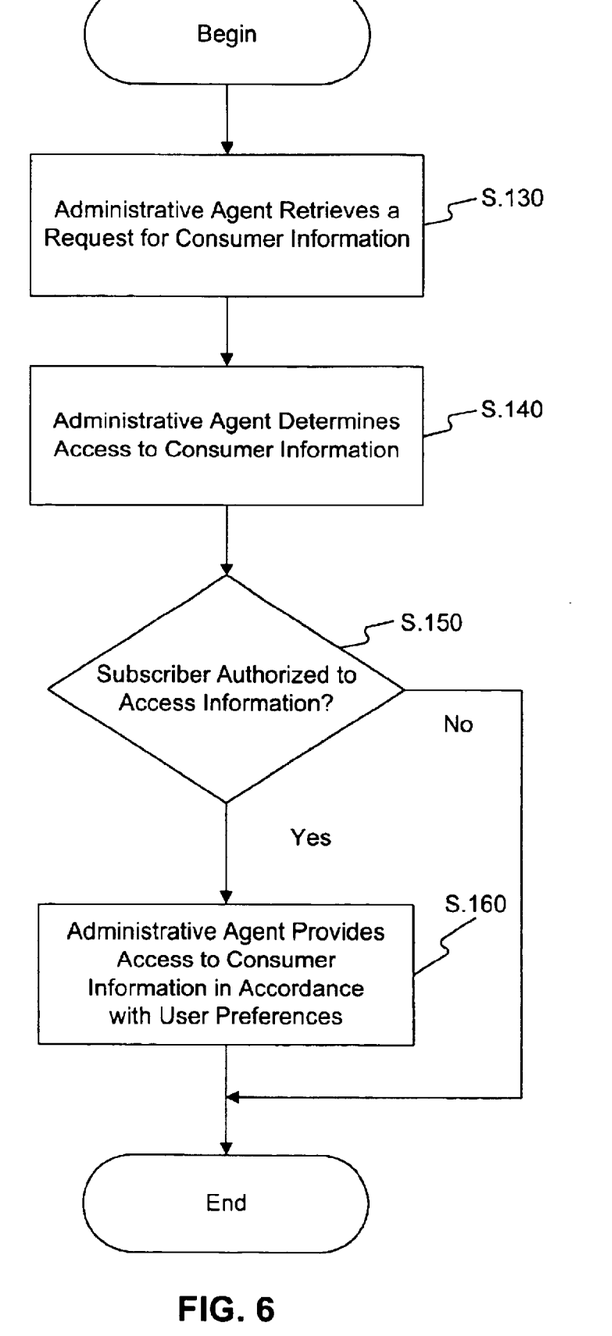
FIG. 6 depicts an exemplary flow chart of a process for providing access to subscribers to the contents of the privacy database.

Besides handling creation and maintenance of privacy database, administrative agent 302 also handles requests for consumer information from subscribers to privacy system 300. FIG. 6 depicts an exemplary flow chart of a process for providing access to subscribers of the contents of the privacy database. As shown in FIG. 6, administrative agent receives a request for consumer information (step S.130). This request for consumer information may be communicated by a subscriber to the administrative agent electronically or via other means. For example, a subscriber may call a privacy database operator to request consumer information regarding a particular user or group of users. Subscribers may also request consumer information through an Internet browser interface.

Administrative agent 302 determines access to consumer information (step S.140). Specifically, as part of this step, the administrative agent may determine whether the subscriber requesting consumer information is a currently subscribed member. Next, the administrative agent determines whether the requesting subscriber is authorized to access the requested consumer information (step S.150). If not, then the administrative agent denies access to the requested information. As part of this step, the administrative agent may notify the subscriber as to the reason for denial. If the subscriber is authorized to access the requested consumer information, then the administrative agent provides access to the requested consumer information in accordance with each user's preferences (step S.160). In one implementation, the consumer information requested by a particular subscriber is delivered to another vendor, who does not transfer the information to the subscriber. Instead, the vendor, such as a print vendor may use the information in accordance with the subscriber's instructions, for example, to print address labels corresponding to an offer.

As part of this step, the administrative agent also notifies payment agent 306 of this transaction. Payment agent 306, as discussed later, handles payments to users who have contributed their personal information to consumer information database 308.

Figure 7:
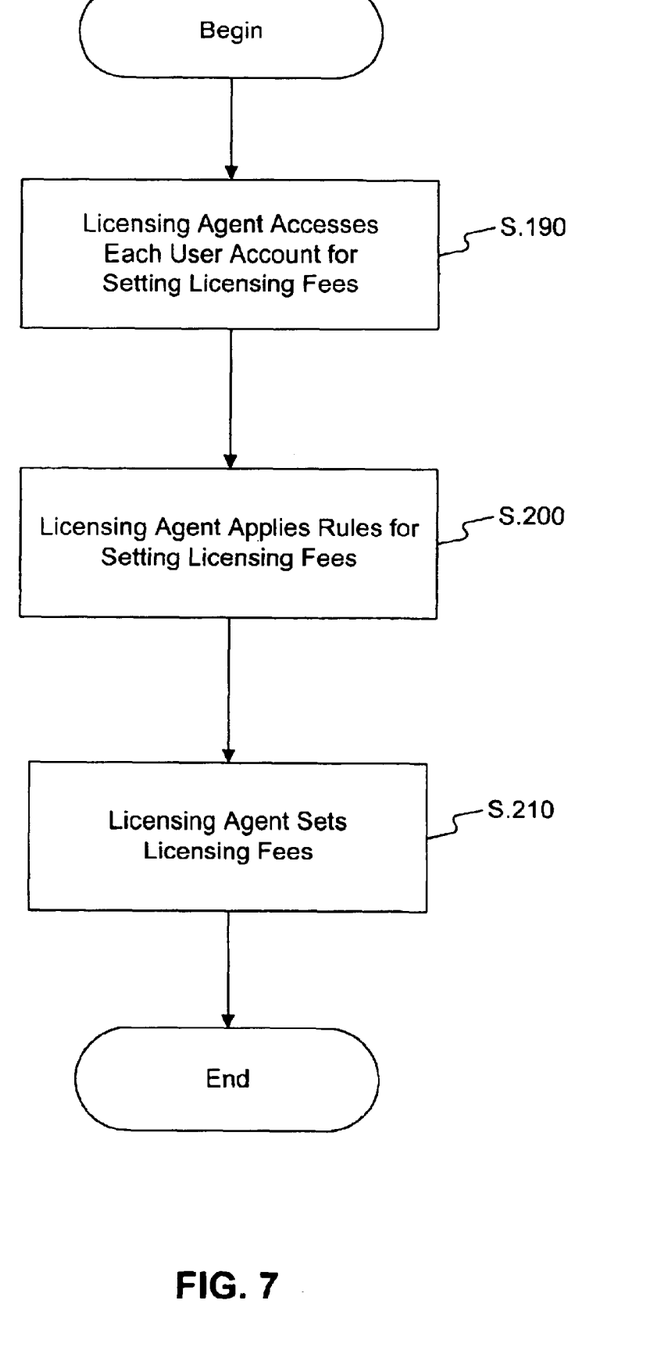
FIG. 7 depicts an exemplary flow chart of a process for setting licensing fees for each user, consistent with the present invention.

As mentioned earlier, licensing agent 304 sets licensing fees to be paid to users or customers, who contribute personal information to privacy system 300. FIG. 7 depicts an exemplary flow chart of a process for setting licensing fees for each user, consistent with the present invention.

As shown in FIG. 7, the first step is performed when licensing agent 304 accesses each account for setting up the licensing fees (step S.190). The licensing agent accesses each account upon initial account setup to establish an initial licensing fee structure. Setting up the fee structure includes setting up a licensing rule and a fee schedule. Licensing rule may include paying a fixed percentage of the privacy system operator's revenue to each user of the system. A licensing rule may included paying a flat rate, for example, a fixed amount to each user of the system per transaction, for example, when a particular user's personal information is used by a subscriber. Additionally, a licensing rule may comprise paying a monthly fee to each user. One skilled in the art will appreciate that other licensing rules could also be used with the present invention.

Several fee schedules may also be setup and used for compensating the users of the privacy system, for example, a declining fee schedule may be used. Other fee schedules may also be used consistent with the present invention. For example, a flat rate or non-declining fee schedule may be used to implement payment to users. In such a case, for example, other rewards or incentives may decline over time where the user does not update their information frequently. A fee schedule that increases the amount of fees paid to users may also be used to compensate loyal users. Such a fee schedule may be used in a situation where updates to user information are automatic and accordingly there is no need to provide an incentive to users to update their personal information.

Subsequently, the licensing agent accesses each account periodically in order to update the licensing fee structure. Having accessed a user account, the licensing agent applies rules for setting up the licensing fee for that account (step S.200). For example, a percentage sharing rule with a declining licensing fee schedule may be used. The declining fee schedule may provide initial licensing fees of, for example, up to 75% of all amounts received by the operator of the privacy system from licensing consumer information specific to that user. The percentage of licensing fee, however, may decline over time. For example, the following month the user may receive only 60% of all amounts received by the operator of the privacy system from licensing consumer information specific to that user. The licensing fee may continue to decline until a pre-established floor, such as 10% is reached. Of course, other types of declining fee schedules may be used. One purpose of setting a declining fee schedule is to create an incentive for each user to update or verify their licensed information. Accordingly, in one implementation, licensing agent 304 resets the percentage of licensing fee to a higher value than, for example, the initial value after a user updates his or her licensed information. In another implementation, the licensing agent resets the percentage of licensing fee to a higher value than, for example, the initial value after a user verifies his or her licensed information. If a user determines that his or her information is incorrect, the user may, to a certain extent, change the information. For credit report or other such information, the user may not change the information; instead the user may access the credit bureau that provided the report to resolve the dispute. The privacy system makes this easier by providing a direct link, for example, a hyper-link to the credit-bureaus web-site. In addition, the privacy system may also provide dispute resolution services to its users.

Users of the privacy system may also be given the opportunity to participate in marketing surveys, opinion polls, or Nielsen ratings activities. Licensing agent 304 may be adapted to keep track of the fees earned by users, who participate in such activities through the privacy system and to facilitate payment. Additionally, users may earn licensing fees for purchasing a service or product from a merchant. Thus, a merchant who is a subscriber may notify the privacy system of a purchase and then based on a licensing fee schedule a certain licensing fee or reward may be deposited in the user's account.

One skilled in the art will appreciate that the users of the system may be paid non-cash fees. Thus, for example, users may receive points instead of cash, which then may be redeemed for cash or non-cash fees. Non-cash fees may include gift certificates, travel vouchers, movie tickets, prepaid phone cards, or other non-cash rewards.

After applying the relevant rule for setting licensing fees, the licensing agent sets the licensing fee structure for each user (step S.210).

Figure 8:
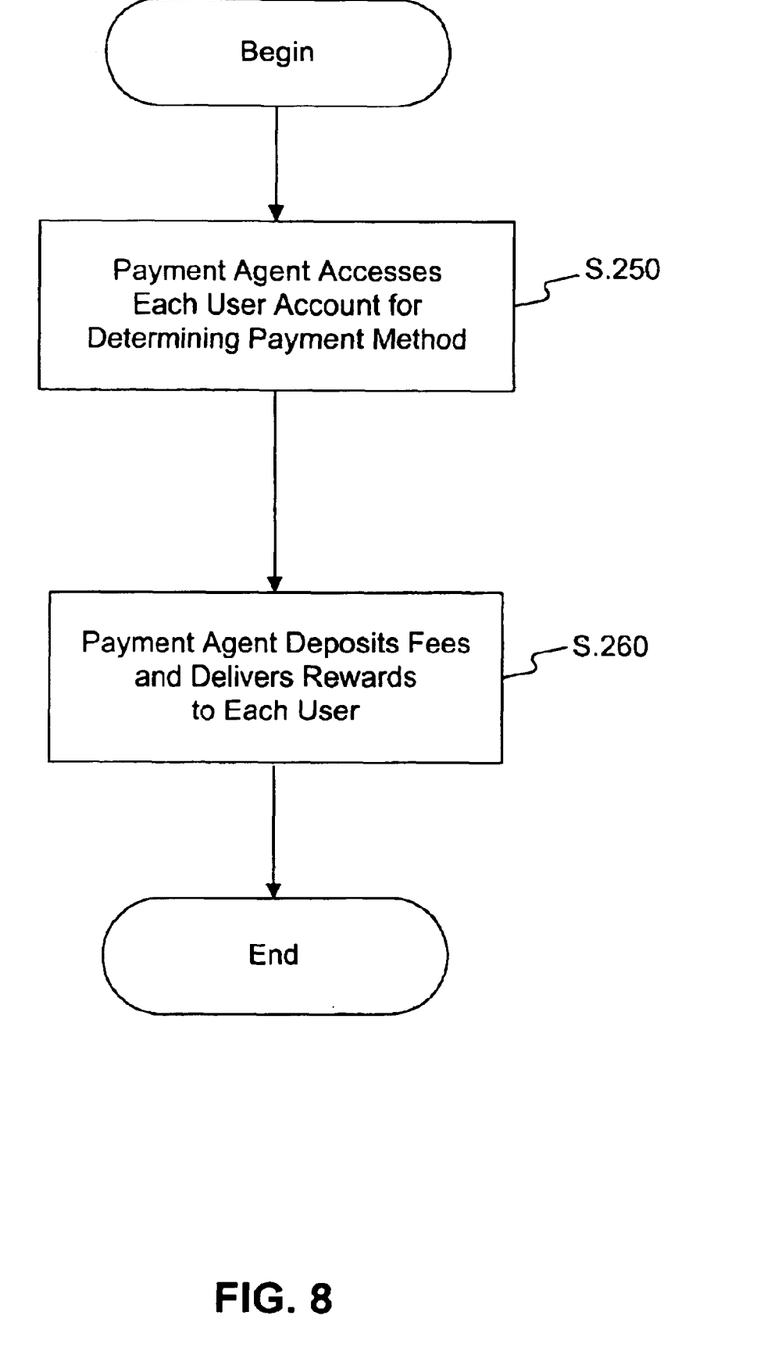
FIG. 8 depicts an exemplary flow chart of a process for making payments to users of the system, consistent with the present invention.

In accordance with an aspect of the invention, payment agent 306 may deposit fees into a user's account on a periodical basis based on licensing fees earned by licensing the user's information or by the user's purchase of a service or product offered by one of the subscribers. The payment agent may interface with an existing bank account of the user to deposit licensing fees or other fees earned by the customer. FIG. 8 depicts an exemplary flow chart of a process for making payments to each user of the privacy system, consistent with the principles of the present invention. As illustrated in FIG. 8, payment agent 306 accesses each user account for determining the payment method associated with each user (step S.250). As part of this step, the payment agent, for example, determines whether to deposit earned licensing fees into an Internet deposit account associated with a particular customer or to deposit the fees into a designated bank account. In addition, as part of this step, the payment agent may also execute other payment rules, which, for example, may provide that a user may not be paid unless a subscriber actually uses the licensed information or unless the user purchases a product or service from the subscriber. Next, the payment agent deposits the licensing fees earned by each customer into the appropriate account (step S.260). The payment agent also handles delivery of other fees or rewards earned by the user.

One skilled in the art will appreciate that the payment agent maintains both a current and a cumulative record of the fees or rewards earned by a user. Thus, using conventional account tracking systems and procedures, payment agent 306 may provide a user a current balance of the fees that a user may have earned and may also provide a cumulative record of the earnings of that user.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software, but the present invention may be implemented as a combination of hardware and software or in hardware alone.

What is claimed is:

1. A system for managing user personal information for access by subscribers, comprising:
   at least one database containing: (1) personal information provided by at least one user in response to an incentive offered to at least one potential user to contribute the personal information to the database; and (2) user access preferences describing an extent to which subscribers may access each respective user's personal information;
   at least one administrative agent for establishing access by subscribers to the personal information contained in the database based on the user access preferences expressed by each user contributing personal information to the database; and
   at least one licensing agent for setting at least one licensing fee schedule for each user contributing the personal information to the database, in response to the incentive based on a set of licensing rules, wherein the licensing fee schedule reflects licensing fees paid to the contributing users and wherein the licensing fee schedule is a declining fee schedule such that a licensing fee paid to a user declines until at least one of: (a) the user's personal information has been updated, or (b) the user's personal information has been verified, and
   a computer processor for performing the functions of at least one of the at least one administrative agent or the at least one licensing agent.

2. The system of claim 1, wherein the licensing agent determines the amount of payment to be made to each user contributing personal information to the database.

3. The system of claim 2, further comprising at least one payment agent for paying to each user the determined amount of payment based on a set of payment rules.

4. The system of claim 2, wherein the set of payment rules includes a payment rule requiring the depositing of fees into an Internet deposit account.

5. The system of claim 2, wherein the set of payment rules includes a payment rule requiring the depositing of fees into a designated bank account.

6. The system of claim 1, wherein the set of licensing rules includes setting the licensing fee schedule such that a contributing user receives a percentage of funds received from subscribers for licensing the personal information related to that user.

7. The system of claim 1, wherein the database containing personal information includes financial information, demographic information, psychometric information, or marketing information.

8. The system of claim 1, wherein the database containing personal information includes user information from at least one third-party source of the user's personal information.

9. The system of claim 1, wherein the declining fee schedule is reset when a user updates their personal information.

10. The system of claim 1, wherein the declining fee schedule is reset when a user verifies their personal information.

11. The system of claim 1, wherein establishing access comprises restricting access by subscribers to the personal information contained in the database based on the preferences expressed by each user.

12. The system of claim 1, wherein establishing access comprises distributing the personal information contained in the database to the subscribers.

13. The system of claim 1, wherein the incentive offered to the at least one user is a discounted product or service.

14. The system of claim 13, wherein the discounted product or service is at least one of a free credit report and a free web-based service.

15. The system of claim 1, wherein the incentive offered to the at least one user is different than the licensing fees paid to the contributing users.

16. The system of claim 1, further including:
   means for determining a type of incentive to offer to each potential user.

17. The system of claim 1, further including:
   means for creating an account for the at least one potential user upon receiving a response to the incentive offer from the at least one potential user.

18. The system of claim 17, wherein the user's response includes the user preferences for access to the user's personal information.

19. The system of claim 17, wherein the user's response includes authorization to access information about the at least one potential user from a third party source of user information.

20. The system of claim 17, wherein the user's response includes the user preferences for receiving offers from a subscriber.

21. The system of claim 1, wherein the access preferences define the extent to which each subscriber has access to the user's personal information stored in the database.

22. The system of claim 21, wherein the access preferences define a type of subscriber that may have access to the user's personal information.

23. A computer-implemented method for sharing consumer information between users and subscribers, comprising:
   offering an incentive to potential users to induce the potential users to contribute consumer information for a database of consumer information;
   receiving access preferences from users contributing personal information in response to the incentive, wherein the access preferences describe an extent to which subscribers may access each respective user's personal information;
   creating the database of consumer information related to consumer information from the users who contributed consumer information in response to the incentive;
   establishing access by subscribers to the consumer information contained in the database based on the access preferences of each of the users;
   setting a licensing fee schedule for each of the users based on a set of licensing rules, wherein the licensing fee schedule is a declining fee schedule such that a licensing fee paid to a user declines until at least one of: (a) the user's consumer information has been updated, or (b) the user's consumer information has been verified;
   determining, by a computer, a payment for each of the users based on the licensing fee schedule and a set of payment rules; and
   paying each of the users their respective payment determined by the computer.

24. The method of claim 23, wherein the database containing consumer information includes financial information, demographic information, psychometric information, or marketing information.

25. The method of claim 23, wherein setting a licensing fee schedule for each user based on the set of licensing rules includes determining the amount of payment to be made to each user.

26. The method of claim 25, wherein paying each user based on the set of payment rules includes paying each user the determined amount of payment.

27. The method of claim 23, wherein setting the licensing fee schedule based on the set of licensing rules includes setting the licensing fee schedule such that a contributing user receives a percentage of funds received from subscribers for licensing the personal information related to that user.

28. The method of claim 23, wherein the database containing consumer information includes user information from at least one third-party source of user information.

29. The method of claim 23, further including resetting the declining fee schedule when a user updates their consumer information.

30. The method of claim 23, further including resetting the declining fee schedule when a user verifies their consumer information.

31. The method of claim 23, wherein the incentive offered to the potential users is a discounted product or service.

32. The method of claim 31, wherein the discounted product or service is at least one of a free credit report and a free web-based service.

33. The method of claim 23, wherein the incentive offered to the potential users is different than a licensing fee paid to each of the plurality of users.

34. The method of claim 23, further including:
determining a type of incentive to offer to each potential user.

35. The method of claim 23, further including:
creating an account for at least one of the potential users upon receiving a response to the incentive offer from the at least one of the potential users.

36. The method of claim 35, wherein the at least one of the potential users' response includes user preferences for access to the at least one of the potential users' personal information.

37. The method of claim 35, wherein the at least one of the potential users' response includes authorization to access information about the at least one of the potential users from a third party source of user information.

38. The method of claim 35, wherein the at least one of the potential users' response includes user preferences for receiving offers from a subscriber.

39. The method of claim 23, wherein the access preferences define the extent to which each subscriber has access to the user's personal information stored in the database.

40. The method of claim 39, wherein the access preferences define a type of subscriber that may have access to the user's personal information.

41. A computer-readable medium containing program instructions for execution by a computer, which, when executed by the computer cause the computer to implement a method for sharing consumer information between users and subscribers, comprising:
offering an incentive to potential users to induce the potential users to contribute consumer information for a database of consumer information;
creating the database of consumer information related to consumer information from a plurality of users who contributed consumer information in response to the incentive;
receiving access preferences from the plurality of users contributing personal information in response to the incentive, wherein the access preferences describe an extent to which subscribers may access each respective user's personal information;
establishing access by subscribers to the consumer information contained in the database based on the access preferences of each of the plurality of users;
setting a licensing fee schedule for each of the plurality of users based on a set of licensing rules, wherein the licensing fee schedule is a declining fee schedule such that a licensing fee paid to a user declines until at least one of: (a) the user's consumer information has been updated, or (b) the user's consumer information has been verified; and
paying each of the plurality of users based on the set of licensing rules and a set of payment rules.

42. The computer-readable medium of claim 41, wherein the database containing consumer information includes financial information, demographic information, psychometric information, or marketing information.

43. The computer-readable medium of claim 41, wherein setting a licensing fee schedule for each user based on the set of licensing rules includes determining the amount of payment to be made to each user.

44. The computer-readable medium of claim 43, wherein paying each user based on the set of payment rules includes paying each user the determined amount of payment.

45. The computer-readable medium of claim 41, wherein setting the licensing fee schedule based on the set of licensing rules includes setting the licensing fee schedule such that a user receives a percentage of funds received from subscribers for licensing the personal information related to that user.

46. The computer-readable medium of claim 41, wherein the database containing consumer information includes consumer information from at least one third-party source of user information.

47. The computer-readable medium of claim 41, further including resetting the declining fee schedule when a user updates their consumer information.

48. The computer-readable medium of claim 41, wherein the method further includes resetting the declining fee schedule when a user verifies their consumer information.

49. The computer-readable medium of claim 41, wherein the incentive offered to the potential users is a discounted product or service.

50. The computer-readable medium of claim 49, wherein the discounted product or service is at least one of a free credit report and a free web-based service.

51. The computer-readable medium of claim 41, wherein the incentive offered to the potential users is different than a licensing fee paid to each of the plurality of users.

52. The computer-readable medium of claim 41, further including:
determining a type of incentive to offer to each potential user.

53. The computer-readable medium of claim 41, further including:
creating an account for at least one of the potential users upon receiving a response to the incentive offer from the at least one of the potential users.

54. The computer-readable medium of claim 53, wherein the at least one of the potential users' response includes user preferences for access to the at least one of the potential users' personal information.

55. The computer-readable medium of claim 53, wherein the at least one of the potential users' response includes authorization to access information about the at least one of the potential users from a third party source of user information.

56. The computer-readable medium of claim 53, wherein the at least one of the potential users' response includes user preferences for receiving offers from a subscriber.

57. The computer-readable medium of claim 41, wherein the access preferences define the extent to which each subscriber has access to the user's personal information stored in the database.

58. The computer-readable medium of claim 57, wherein the access preferences define a type of subscriber that may have access to the user's personal information.

59. A system for sharing consumer information between users and subscribers, comprising:
   means for offering an incentive to potential users to induce the potential users to contribute consumer information for a database of consumer information;
   means for creating the database of consumer information related to consumer information from a plurality of users who contributed consumer information in response to the incentive;
   means for receiving access preferences from the plurality of users contributing personal information in response to the incentive, wherein the access preferences describe an extent to which subscribers may access each respective user's personal information;
   means for establishing by subscribers access to the consumer information contained in the database based on the access preferences of each of the plurality of users;
   means for setting a licensing fee schedule for each of the plurality of users based on a set of licensing rules, wherein the licensing fee schedule is a declining fee schedule such that a licensing fee paid to a user declines until at least one of: (a) the user's consumer information has been updated, or (b) the user's consumer information has been verified; and
   means for paying each of the plurality of users based on the set of licensing rules and a set of payment rules.

60. The system of claim 59, wherein the database containing consumer information includes financial information, demographic information, psychometric information, or marketing information.

61. The system of claim 59, wherein the means for setting a licensing fee schedule for each user based on the set of licensing rules includes:
   means for determining the amount of payment to be made to each user.

62. The system of claim 61, wherein the means for paying each user based on the set of payment rules includes:
   means for paying each user the determined amount of payment.

63. The system of claim 59, wherein the means for setting the licensing fee schedule based on the set of licensing rules includes:
   means for setting the licensing fee schedule such that a contributing user receives a percentage of funds received from subscribers for licensing the personal information related to that user.

64. The system of claim 59, wherein the database containing consumer information includes consumer information from at least one third-party source of user information.

65. The system of claim 59, further including:
   means for resetting the declining fee schedule when a user updates their consumer information.

66. The system of claim 59, further including:
   means for resetting the declining fee schedule when a user verifies their consumer information.

67. The system of claim 59, wherein the incentive offered to the potential users is a discounted product or service.

68. The system of claim 67, wherein the discounted product or service is at least one of a free credit report and a free web-based service.

69. The system of claim 59, wherein the incentive offered to the potential users is different than a licensing fee paid to each of the plurality of users.

70. The system of claim 59, further including:
   means for determining a type of incentive to offer to each potential user.

71. The system of claim 59, further including:
   means for creating an account for at least one of the potential users upon receiving a response to the incentive offer from the at least one of the potential users.

72. The system of claim 71, wherein the at least one of the potential users' response includes user preferences for access to the at least one of the potential users' personal information.

73. The system of claim 71, wherein the at least one of the potential users' response includes authorization to access information about the at least one of the potential users from a third party source of user information.

74. The system of claim 71, wherein the at least one of the potential users' response includes user preferences for receiving offers from a subscriber.

75. The system of claim 59, wherein the access preferences define the extent to which each subscriber has access to the user's personal information stored in the database.

76. The system of claim 75, wherein the access preferences define a type of subscriber that may have access to the user's personal information.

77. A computer-implemented method for sharing consumer information between users and subscribers, comprising:
   creating a database of consumer information related to a plurality of users;
   receiving access preferences from each of the plurality of users who contributed information to database providing at least one of a type of subscribers and an extent of sharing of the consumer information with the subscribers;
   establishing access by subscribers to the consumer information contained in the database based on the access preferences of each user;
   setting a licensing fee schedule for each user based on a set of licensing rules, wherein the licensing fee schedule is a declining licensing fee schedule, and wherein the declining fee schedule is reset when at least one of: (a) the user updates their consumer information, or (b) the user verifies their consumer information;
   determining, by a computer, a payment for each user based on the licensing fee schedule and a set of payment rules, wherein one of the set of payment rules includes paying the user for purchasing a product or service from one of the subscribers; and
   paying each user their respective payment determined by the computer.

78. The method of claim 77, wherein the licensing fee paid to a user is reset when the user updates the consumer information.

79. The method of claim 77, wherein the licensing fee paid to a user is reset when the user verifies the consumer information.

80. The method of claim 77, wherein setting the licensing fee schedule based on the set of licensing rules includes setting the licensing fee schedule such that a contributing user receives a percentage of funds received from subscribers for licensing the information related to that user.

81. The system of claim 80, wherein setting the licensing fee schedule such that a contributing user receives a percentage of funds includes setting the licensing fee schedule such that the contributing user receives a fixed percentage of the funds.

82. The method of claim 77, wherein the access preferences define the extent to which each subscriber has access to the user's personal information stored in the database.

83. The method of claim 77, wherein the access preferences define a type of subscriber that may have access to the user's personal information.

84. The method of claim 77, wherein the access preferences include authorization to access information about the user from a third party source of information.

85. A computer-implemented method for sharing consumer information between users and subscribers comprising:

creating a database of consumer information related to a plurality of users;

receiving access preferences from users contributing personal information, wherein the access preferences describe an extent to which subscribers may access each respective user's personal information;

establishing access by subscribers to the consumer information contained in the database based on the access preferences of each user;

setting a licensing fee schedule for each user based on a set of licensing rules, wherein the licensing fee schedule is a declining licensing fee schedule, and wherein the declining fee schedule is reset when at least one of: (a) the user updates their consumer information, or (b) the user verifies their consumer information;

determining, by a computer, a payment for each user based on the licensing fee schedule and a set of payment rules; and paying each of the users their respective payment determined by the computer.

86. The method of claim 85, wherein the access preferences define the extent to which each subscriber has access to the user's personal information stored in the database.

87. The method of claim 85, wherein the access preferences define a type of subscriber that may have access to the user's personal information.

88. The method of claim 85, wherein the access preferences include authorization to access information about the user from a third party source of information.

89. A system for sharing consumer information between users and subscribers comprising:

a database of consumer information related to a plurality of users;

means for receiving access preferences from users contributing personal information, wherein the access preferences describe an extent to which subscribers may access each respective user's personal information;

means for establishing access by subscribers to the consumer information contained in the database based on the access preferences of each user;

means for setting a licensing fee schedule for each user based on a set of licensing rules, wherein the licensing fee schedule is a declining licensing fee schedule, and wherein the declining fee schedule is reset when at least one of: (a) the user updates their consumer information, or (b) the user verifies their consumer information; and means for paying each user based on the licensing fee schedule and a set of payment rules.

90. A computer-implemented method for sharing consumer information between users and subscribers, comprising:

creating a database of information related to consumer information from a plurality of users;

receiving access preferences from users contributing personal information in response to the incentive, wherein the access preferences describe an extent to which subscribers may access each respective user's personal information;

establishing access by subscribers to the consumer information contained in the database based on the access preferences of each of the plurality of users;

setting a licensing fee schedule for each of the plurality of users based on a set of licensing rules;

determining, by a computer, a payment for each of the plurality of users based on the licensing fee schedule and a set of payment rules, wherein the licensing fee schedule is a declining fee schedule such that a licensing fee paid to a user declines until at least one of: (a) the user's consumer information has been updated, or (b) the user's consumer information has been verified; and paying each of the users their respective payment determined by the computer.

91. The method of claim 90, wherein the licensing fee paid to a user is reset when the user updates the consumer information.

92. The method of claim 90, wherein the licensing fee paid to a user is reset when the user verifies the consumer information.

93. The method of claim 90, wherein the access preferences define the extent to which each subscriber has access to the user's personal information stored in the database.

94. The method of claim 90, wherein the access preferences define a type of subscriber that may have access to the user's personal information.

95. The method of claim 90, wherein the access preferences include authorization to access information about the user from a third party source of information.

96. A system for sharing consumer information between users and subscribers, comprising:

at least one database containing: (1) consumer information provided by at least one user in response to an incentive offered to at least one potential user to contribute the consumer information to the database; and (2) user access preferences describing an extent to which subscribers may access each respective user's consumer information;

at least one administrative agent for establishing access by subscribers to the consumer information contained in the database based on the user access preferences expressed by each user contributing consumer information to the database;

at least one licensing agent for setting at least one licensing fee schedule for each user contributing the consumer information to the database, in response to the incentive based on a set of licensing rules, wherein the licensing fee schedule reflects licensing fees paid to the contributing users; and at least one payment agent for paying each of the users based on the licensing fee schedule and a set of payment rules, wherein the licensing fee schedule is a declining fee schedule such that a licensing fee paid to a user declines until at least one of: (a) the user's consumer information has been updated, or (b) the user's consumer information has been verified, and a computer processor for performing the functions of at least one of the at least one administrative agent or the at least one licensing agent.

97. The system of claim 96, wherein the licensing fee paid to a user is reset when the user updates the consumer information.

98. The system of claim 96, wherein the licensing fee paid to a user is reset when the user verifies the consumer information.

99. A system for managing user personal information for access by subscribers, comprising:

at least one database containing: (1) personal information provided by at least one user in response to an incentive offered to at least one potential user to contribute the personal information to the database; and (2) user access preferences describing an extent to which subscribers may access each respective user's personal information;

at least one administrative agent for establishing access by subscribers to the personal information contained in the database based on the user access preferences expressed by each user contributing personal information to the database; and at least one licensing agent for setting at least one licensing fee schedule for each user contributing the personal information to the database, in response to the incentive based on a set of licensing rules, wherein the licensing fee schedule reflects licensing fees paid to the contributing users, and wherein the licensing fee schedule is a declining fee schedule such that a licensing fee paid to a user declines until at least at least one of: (a) the user's personal information has been updated, or (b) the user's personal information has been verified; and a computer processor for performing the functions of at least one of the at least one administrative agent or the at least one licensing agent;

wherein at least one user's response includes authorization to access information about the at least one potential user from a third party source of user information.

100. A computer-implemented method for sharing consumer information between users and subscribers, comprising:

offering an incentive to potential users to induce the potential users to contribute consumer information for a database of consumer information;

receiving access preferences from users contributing personal information in response to the incentive, wherein the access preferences describe an extent to which subscribers may access each respective user's personal information, and wherein at least one of the potential users' response includes authorization to access information about the at least one of the potential users from a third party source of user information;

creating the database of consumer information related to consumer information from the users who contributed consumer information in response to the incentive;

establishing access by subscribers to the consumer information contained in the database based on the access preferences of each of the users;

setting a licensing fee schedule for each of the users based on a set of licensing rules, wherein the licensing fee schedule is a declining fee schedule such that a licensing fee paid to a user declines until at least at least one of: (a) the user's consumer information has been updated, or (b) the user's consumer information has been verified;

determining, by a computer, a payment for each of the users based on the licensing fee schedule and a set of payment rules; and paying each of the users their respective payment determined by the computer.

101. A computer-readable medium containing program instructions for execution by a computer, which, when executed by the computer cause the computer to implement a method for sharing consumer information between users and subscribers, comprising:

offering an incentive to potential users to induce the potential users to contribute consumer information for a database of consumer information;

creating the database of consumer information related to consumer information from a plurality of users who contributed consumer information in response to the incentive;

receiving access preferences from the plurality of users contributing personal information in response to the incentive, wherein the access preferences describe an extent to which subscribers may access each respective user's personal information, and wherein at least one of the potential users' response includes authorization to access information about the at least one of the potential users from a third party source of user information;

establishing access by subscribers to the consumer information contained in the database based on the access preferences of each of the plurality of users;

setting a licensing fee schedule for each of the plurality of users based on a set of licensing rules, wherein the licensing fee schedule is a declining fee schedule such that a licensing fee paid to a user declines until at least at least one of: (a) the user's consumer information has been updated, or (b) the user's consumer information has been verified; and paying each of the plurality of users based on the set of licensing rules and a set of payment rules.

102. A system for sharing consumer information between users and subscribers, comprising:

means for offering an incentive to potential users to induce the potential users to contribute consumer information for a database of consumer information;

means for creating the database of consumer information related to consumer information from a plurality of users who contributed consumer information in response to the incentive;

means for receiving access preferences from the plurality of users contributing personal information in response to the incentive, wherein the access preferences describe an extent to which subscribers may access each respective user's personal information, and wherein at least one of the potential users' response includes authorization to access information about the at least one of the potential users from a third party source of user information;

means for establishing by subscribers access to the consumer information contained in the database based on the access preferences of each of the plurality of users;

means for setting a licensing fee schedule for each of the plurality of users based on a set of licensing rules, wherein the licensing fee schedule is a declining fee schedule such that a licensing fee paid to a user declines until at least at least one of: (a) the user's consumer information has been updated, or (b) the user's consumer information has been verified; and means for paying each of the plurality of users based on the set of licensing rules and a set of payment rules.

* * * * *

UNITED STATES PATENT AND TRADEMARK OFFICE
CERTIFICATE OF CORRECTION

PATENT NO. : 6,947,897 B2
DATED : September 20, 2005
INVENTOR(S) : Frank D. Lortscher et al.

It is certified that error appears in the above-identified patent and that said Letters Patent is hereby corrected as shown below:

Column 18,
Lines 66-67, change "agent or the at least one licensing agent." to -- agent, the at least one licensing agent or the at least one payment agent. --.

Column 19,
Line 28, change "until at least at least one" to -- until at least one --.
Line 61, change "until at least at least one" to -- until at least one --.

Column 20,
Lines 29-30, change "until at least at least one" to -- until at least one --.
Line 61, change "until at least at least one" to -- until at least one --.

Signed and Sealed this

Sixth Day of December, 2005

JON W. DUDAS
*Director of the United States Patent and Trademark Office*